(12) United States Patent
Koranne et al.

(10) Patent No.: US 8,158,257 B2
(45) Date of Patent: Apr. 17, 2012

(54) SULFUR TOLERANT ALUMINA CATALYST SUPPORT

(75) Inventors: Manoj Mukund Koranne, Clarksville, MD (US); James Neil Pryor, West Friendship, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 3 days.

(21) Appl. No.: 12/311,574

(22) PCT Filed: Sep. 12, 2007

(86) PCT No.: PCT/US2007/019798
§ 371 (c)(1), (2), (4) Date: Dec. 19, 2009

(87) PCT Pub. No.: WO2008/042084
PCT Pub. Date: Apr. 10, 2008

(65) Prior Publication Data
US 2010/0120612 A1    May 13, 2010

(51) Int. Cl.
| | |
|---|---|
| *B32B 5/16* | (2006.01) |
| *B32B 9/00* | (2006.01) |
| *B32B 15/02* | (2006.01) |
| *B32B 17/02* | (2006.01) |
| *B32B 19/00* | (2006.01) |
| *B32B 21/02* | (2006.01) |
| *B32B 23/02* | (2006.01) |
| *B32B 27/02* | (2006.01) |
| *B01J 21/00* | (2006.01) |
| *B01J 23/00* | (2006.01) |
| *B01J 23/44* | (2006.01) |
| *B01J 23/42* | (2006.01) |
| *B01J 23/08* | (2006.01) |
| *B01J 21/04* | (2006.01) |
| *B01J 23/02* | (2006.01) |

(52) U.S. Cl. ........ 428/404; 502/261; 502/262; 502/263; 502/325; 502/333; 502/334; 502/355; 502/439

(58) Field of Classification Search .................. 502/263, 502/325, 332–334, 339, 261; 428/404
See application file for complete search history.

(56) References Cited

U.S. PATENT DOCUMENTS

| | | | |
|---|---|---|---|
| 2,804,433 A | 8/1957 | Hervert et al. | 252/453 |
| 3,269,939 A | 8/1966 | Marechal et al. | 208/143 |
| 3,518,206 A * | 6/1970 | Stiles et al. | 502/64 |
| 3,703,461 A | 11/1972 | Hamsford | 208/143 |
| 3,923,692 A | 12/1975 | Braithwaite et al. | 502/238 |
| 3,925,253 A | 12/1975 | Stephens | 502/241 |
| RE29,771 E | 9/1978 | Cull et al. | 502/241 |
| 4,593,007 A * | 6/1986 | Novinski | 501/105 |
| 4,708,945 A * | 11/1987 | Murrell et al. | 502/263 |
| 4,764,498 A * | 8/1988 | Wissner et al. | 502/251 |
| 4,778,779 A * | 10/1988 | Murrell et al. | 502/263 |
| 4,959,338 A * | 9/1990 | Miura et al. | 502/263 |
| 6,288,007 B1 | 9/2001 | Lindblad et al. | 502/261 |
| 6,399,530 B1 | 6/2002 | Chen et al. | 502/64 |
| 6,638,889 B1 * | 10/2003 | Van Berge et al. | 502/300 |
| 6,992,040 B2 * | 1/2006 | Muller et al. | 502/327 |
| 7,348,263 B2 * | 3/2008 | Hashimoto | 438/460 |
| 2003/0162849 A1 | 8/2003 | Van Berge et al. | |
| 2005/0124490 A1 * | 6/2005 | Timken | 502/325 |

FOREIGN PATENT DOCUMENTS

DE    05 3830318    3/1990

* cited by examiner

*Primary Examiner* — Steven Bos
*Assistant Examiner* — Anthony J Zimmer
(74) *Attorney, Agent, or Firm* — Charles A. Cross; Howard J. Troffkin

(57) ABSTRACT

The present invention is directed to an improved catalyst support and to the resultant catalyst suitable for treating exhaust products from internal combustion engines, especially diesel engines. The support of the present invention is a structure comprising alumina core particulate having high porosity and surface area, wherein the structure has from about 1 to about 8 weight percent silica in the form of cladding on the surface area of said alumina core. The resultant support has a sulfur tolerance efficiency ($\eta$) of at least 1000 μg/m2.

30 Claims, No Drawings

SULFUR TOLERANT ALUMINA CATALYST SUPPORT

BACKGROUND OF THE INVENTION

The present invention is directed to an improved catalyst support and to the resultant catalyst suitable for treating exhaust products from internal combustion engines, especially diesel engines. The support of the present invention provides a means of inhibiting the degradative effects on exhaust gas conversion catalysts associated with sulfur and sulfurous compounds found in combustion engine exhaust products.

The exhaust products of internal combustion engines are known health hazards to human beings, animals as well as plant life. The pollutants are, in general, unburnt hydrocarbons, carbon monoxide, nitrogen oxides, as well as residual amounts of sulfur and sulfurous compounds.

Exhaust catalysts have to meet stringent requirements with respect to light-off performance, effectiveness, long-term activity, mechanical stability as well as cost effectiveness in order to be suitable for vehicle application. For example, exhaust catalysts must become active at low operating temperatures initially encountered under start-up conditions and, at the same time, must be able to cause high percentage of conversion of the pollutants under varying temperature and space velocity ranges encountered during normal operation.

The pollutants of unburnt hydrocarbons, carbon monoxides as well as nitrogen oxides have been successfully treated by contact with multifunctional, noble metal catalysts which are capable of converting a high percentage of the pollutants into less harmful products of carbon dioxide, water (steam) and nitrogen. However, the sulfur and sulfurous compounds present in fuels and, in turn, in exhaust product have been known to poison the noble metals resulting in lessening their catalytic effectiveness and life. Recently, fuels useful for internal combustion engines have come under stringent regulations with respect to their content of sulfur and sulfur containing compounds. However, complete removal of these materials, especially from middle cut petroleum feedstock ($C_{10}$ and greater hydrocarbons), is difficult to accomplish due to the complex nature and scope of such compounds. Thus, sulfurous materials are present in fuels for internal combustion engines, especially in fuels for diesel fuel combustion engines.

The "catalytic converter" used to convert the harmful pollutants into non-harmful gases, usually consists of three components—the catalytically active metal, the support on to which the active metal is dispersed, and a substrate on to which the support is applied or "washcoated".

The catalytic metals that are useful to cause effective conversion of harmful pollutants, like carbon monoxide, nitrogen oxides, and unburnt hydrocarbons under the varying conditions encountered, are noble metals, usually the metals of the platinum group, such as platinum, palladium, rhodium and mixtures thereof. These noble metal catalysts are described in DE-05 38 30 318, which is incorporated herein in its entirety by reference.

The noble metals are conventionally supported on high surface area oxides, such as aluminum oxide (or alumina). The high surface area alumina is applied or "washcoated" onto a ceramic or metallic substrate, such as in the form of a honeycomb monolith or wire mesh or the like structure. It is also possible to apply the noble metals onto the support after washcoating the support material onto the monolith.

Various forms of alumina are commonly used as high surface area support material for emission control catalysts because of their availability, ease of formation, thermal properties and their ability to promote the catalytic activity of the noble metal. However, the disadvantage of alumina supports are that they adsorb sulfur and/or sulfurous compounds, as found in the engine emission stream. When so adsorbed, the sulfurous compounds are known to poison noble metal catalysts, especially those formed with platinum metal, causing reduction in activity and effective life of the catalyst system.

In contrast to alumina, silica supports are known not to interact with sulfur and sulfurous compounds. Therefore, noble metal catalysts formed with silica as the high, surface area support material do not exhibit poisoning by sulfur and sulfurous compounds. However, silica does not exhibit the hydrothermal stability required to form effective emission control catalyst supports and, therefore, is not a desirable catalyst support material for such applications.

In attempts to overcome the poor hydrothermal properties associated with silica, it has been added to alumina supports either by standard impregnation or co-precipitation techniques (See U.S. Pat. No. 2,804,433). In both instances, the resultant support retains a significant amount of exposed alumina and, therefore, these supports still exhibit a high degree of susceptibility to sulfur poisoning. Further, the applied silica tends to precipitate in the pores of the alumina causing a reduction in porosity to, thus, reduce the surface area upon which the noble metal can reside.

U.S. Pat. No. 3,925,253 discloses an alumina support that has been impregnated with silica by applying an aqueous solution or sol of silica to the alumina support material. Although this material exhibits good attrition resistance, the alumina remains exposed and susceptible to poisoning by the sulfur in the emission product. It is known that conventional impregnation techniques permit the silica to precipitate or agglomerate (due to its tendency to favor homogenous nucleation of discrete silica particles) to form a discontinuous, patch-like coating of irregular thickness on the surface of the alumina.

U.S. Pat. No. 3,923,692 discloses an alumina support, in the form of beads, spheres, or extrudates, which is first contacted with an agent capable of solubilizing the alumina at the particles' surface. The thus treated alumina structure is then impregnated with a silica solution to form a mixed silica-alumina surface. The resultant support is taught to have enhanced activity as a hydrodesulphurization catalyst.

Similarly, RE 29,771 discloses a sulfur adsorbent composed of alumina support having silica coating to enhance the strength of the material. The reference states that silica should not be used in greater than 5% in order to leave alumina exposed to cause sulfur dioxide to be adsorbed. Thus, the teaching directs one to retain a large amount of exposed alumina surface.

Alternately, support materials have been formed by co-precipitation of silica and alumina precursors to achieve a mixed support product.

U.S. Pat. No. 6,399,530 discloses a silica-alumina co-precipitated product, which further contains a Y-type zeolite for hydrocracking of petroleum. The silica-alumina product has enhanced attrition properties in comparison to alumina supported zeolite catalysts. Such a product would have large amounts of exposed alumina which may interact with sulfur containing materials.

U.S. Pat. No. 3,269,939 discloses a noble metal catalyst using a co-precipitated silica-alumina support in which silica comprises from 75 to 90 wt. percent of the support. Because of the large content of silica throughout the formed support, it is taught to have high tolerance to the presence of sulfur. However, such material would exhibit poor hydrothermal properties.

U.S. Pat. No. 3,703,461 discloses a silica-alumina support formed from an alumina gel into which a silica-alumina cogel is dispersed. The noble metal is then added using an ion exchange process.

Although U.S. Pat. No. '939 and U.S. Pat. No. '461 both provide a support having enhanced sulfur tolerance, the materials exhibit poor hydrothermal properties.

U.S. Pat. No. 6,288,007 discloses an alumina support having its surface treated with silica either by impregnation or from a gas phase deposition. The impregnation is conducted by first forming a solution of a silicon compound, contacting the alumina support with the solution and then, at elevated temperature, treating the support with air or water to convert it to an oxide.

It is desired to form an alumina catalyst support capable of enhancing the activity of noble metals in the conversion of carbon monoxide and hydrocarbon materials to carbon dioxide and water while exhibiting high tolerance to the presence of sulfur and sulfurous compounds.

It is further desired to form an alumina catalyst support having a minor amount of silica clad on the support's surface while exhibiting high efficiency to tolerate the presence of sulfur and sulfurous compounds. Catalysts formed with the silica clad alumina support of the present invention are capable of converting noxious emission products of internal combustion engines, especially diesel engines, to more environmentally benign products. Such catalysts exhibit higher activity over an extended life because of its enhanced efficiency to tolerate the presence of sulfurous compounds.

SUMMARY OF THE INVENTION

The present invention is directed to a silica clad high surface area alumina suitable as a support for forming noble metal catalysts. The resultant catalysts exhibit resistance to sulfur poisoning and, therefore, are useful in applications directed to internal combustion engine emission conversion. Specifically, the present invention is directed to high surface area alumina particulate having low amounts of from 1 to 8 weight percent silica with respect to the resultant support in the form of an ultra-thin silica cladding on the surface of the alumina. The resultant silica clad high surface area alumina particulate unexpectedly exhibits enhanced efficiency in sulfur tolerance of at least 1000 $\mu g/m^2$ per mass fraction of silica. Thus, the present product aids in providing a resultant catalyst having superior performance and effective life in comparison to that of alumina support having the same weight percentage of silica thereon formed by conventional impregnation or co-precipitation techniques.

The present invention provides a highly desired support for noble metal catalyst application. The resultant catalyst product exhibits enhanced activity in treating noxious emission products of internal combustion engines, especially diesel engines while having an extended active period due to its enhanced tolerance to sulfur and sulfurous products.

DETAILED DESCRIPTION

The present invention is directed to an improved alumina support for forming noble metal catalysts. The support product fully described herein below is useful in forming an exhaust catalyst having increased tolerance to the presence of sulfur normally found in emission product streams of internal combustion engines and the like and, thereby, achieves lower poisoning of the noble metal of the resultant catalyst than with catalysts utilizing conventionally formed supports.

The support of the present invention is generally in the form of particulate comprising alumina having a cladding of silica thereon.

The following terms, used in the present description and the appended claims, have the following definitions:

The term "support" refers to a material onto which an active catalytic material is applied. In the present invention, the support comprises a high surface area alumina material capable of having a noble-metal deposited on its surface in catalytic amounts.

The term "particulate" refers to shaped particles in the form of powder, beads, extrudates, and the like. In this teaching, it is used in reference to cores, supports as well as the resultant supported noble metal products.

The term "alumina" refers to any of the forms of aluminum oxide alone or as a mixture with small deposit amounts of other metal and/or metal oxides.

The term "coating" refers to a surface covering which is in the form of a relatively thick, discontinuous coverage of irregular thickness on core particulates. Coatings are formed by conventional impregnation or co-precipitation processes known in the art and are of relatively thick, irregular design.

The term "cladding" or "clad" refers to a surface covering which is in the form of substantially continuous or discontinuous coverage of substantially uniform thickness on alumina core particulates. In instances where the cladding is of a partial or discontinuous form on the alumina core surface, the partial cladding comprises an ultra-thin (e.g. molecular thickness) deposited layer of silica (in this case) providing relatively high surface coverage per unit of silica. Thus, a clad support provides a distinctly more efficient coverage per unit of the deposited material than attainable by conventional coated products.

The term "core" refers to alumina particulate prior to cladding according to the present invention. Such uncladded alumina particulate material has been utilized as support material by the prior art. The alumina may further contain other metals and metal and non-metal oxides and the like.

The term "adsorbed" or "adsorption" shall refer to the phenomena of adsorption (the ability to hold or concentrate gases, liquid or dissolved substances on the surface of the adsorbent [e.g. alumina]), absorption (the ability to hold or concentrate gases, liquids or dissolved substances throughout the body of the absorbent [e.g. alumina]); either by chemical reaction which may be ionic, covalent or of mixed nature or by physical forces.

The term "sulfurous material" refers to sulfur, sulfur oxides and compounds containing sulfur atoms.

The present improved support is composed of high surface area alumina particulate having a silica cladding thereon in sufficient amount and form to exhibit superior efficiency of tolerance with respect to adsorption of sulfurous material, as fully described herein below.

The alumina may be selected from any aluminum oxide form desired for the particular application contemplated. It is well known that alumina or aluminum oxide occurs in various modifications with the more common ones being:

gamma-alumina, a form stable up to about 900° C. at which temperature it converts to delta-alumina (a preferred material);

delta alumina, a form stable up to about 1000° C. at which temperature it converts to theta-alumina;

theta-alumina, a form stable up to about 1100° C. at which temperature it converts to alpha-alumina;

aluminum monohydrate or Böhmite, which is prepared by a variety of routes such as the addition of ammonium hydroxide to an aqueous solution of aluminum chloride. The material initially precipitates as an amorphous floc, which rapidly converts to crystalline Böhmite. Alternately, it is prepared by reaction of aluminum sulfate with sodium aluminate.

aluminum trihydate or Gibbsite;

other forms of hydrated aluminum oxide such as bayerite and the like;

other forms of alumina, such as eta-alumina and the like

The preferred alumina for use as a core in forming the support of the present invention is selected from delta-alumina, gamma-alumina or mixtures thereof.

The alumina can be doped with conventional dopants, such as transition metals and metal oxides, alkaline earth metal oxides, rare-earth oxides, silica and the like and mixtures thereof. Examples of such dopants include rare earth metals and their oxides (in particular, lanthana), magnesia, calcia, nickel oxide, zinc oxide, silica and the like with lanthana being a preferred dopant. A dopant, when used, is normally present in small amounts, such as from 0.1 to 10, preferably from 1 to 5 weight percent, of the high surface area alumina particulate core material (prior to cladding according to the present invention).

The dopants are normally present in the alumina particulate to impart particular properties, such as hydrothermal stability, abrasion strength, catalytic activity promotion and the like, as is well known to the artisan.

The high surface area alumina particulate may be in the form of powder (preferred) having a average particle size of from about 1 to 200 μm, preferably from 10 to 100 μm; or beads having an average particle size of from 1 mm to 10 mm. Alternately, the alumina particulate can be in the form of pellets or extrudate (e.g. cylindrical shape). The size and particular shape being determined by the particular application contemplated.

In all instances, the base (core) of the support composed of alumina particulate should have a high (BET) surface area of at least about 20 $m^2/g$, such as from about 20 to about 400 $m^2/g$, preferably from about 75 to 350 $m^2/g$ and more preferably from 100 to 250 $m^2/g$. The core alumina particulate of the support has a pore volume of at least about 0.2 cc/g, such as from 0.2 to 2 cc/g and preferably from 0.5 to 1.2 cc/g and an average pore diameter within the range of 50 to 1000 Angstroms, preferably from 100 to 300 Angstroms. Such high surface area particulate provides ample surface area for deposition of a noble metal catalyst and having it readily contacted with the emission stream to provide effective catalytic conversion of the noxious products to more benign emission products.

The particulate aluminum hydrates are normally calcined to remove residual water and to convert aluminum hydroxyl groups to their oxide counterpart (although residual hydroxyl groups remain as part of the alumina structure, especially on the surface of the particles).

Alumina particulates, suitable as a core for the present clad support product, are commercially available. However, particular design criteria (such as use of particular dopant, particulate pore volume, and the like) for a particular application may require fabrication of the alumina particulate by known methods.

It has been presently found that alumina particulate material clad with silica according to the present invention provides a support for noble-metal catalysts, which exhibit enhanced sulfur tolerance in comparison to supports having the same silica content formed by conventional impregnation or co-precipitation methods. It is well known that petroleum feed used in forming light (gasoline) and moderate (diesel) weight fuels contain sulfur and sulfur containing compounds (e.g. thiophenes and the like) as part of the feed material. Although efforts have been made to remove sulfurous materials, this is increasingly difficult to achieve with respect to fuel product streams of higher molecular weights (e.g. diesel fuels). Thus, sulfurous materials are known to be present in hydrocarbon fuels, especially in diesel fuels. The sulfurous materials present in the emission stream of hydrocarbon fuel-burning engines are known to be adsorbed by alumina and certain dopants which, in turn, cause poisoning of the noble metal residing on the support surface. The unexpected high tolerance (lack of adsorption) to sulfur that is achieved by the low content silica clad alumina support of the present invention permits the economical formation of desired catalyst for effectively treating emission product streams of internal combustion engines, especially diesel fuel engines. The ultra-thin nature of the silica cladding of the present invention allows for improved mass transfer while not imparting bridging of the pore surfaces which would reduce the porosity of the alumina core.

It has been previously suggested to combine alumina with silica either by co-precipitation or impregnation techniques to achieve a support product. As discussed above, alumina supports having fixed amounts of silica, which are generated by these techniques still have significant amount of exposed alumina surface capable of adsorbing sulfurous material at levels far greater than the silica-clad alumina of the present invention.

When the silica is made part of the support by co-precipitation of alumina and silica, the resultant core support has a portion of the silica embedded in and a part of the body of the support. Only a portion of the silica so used forms part of the surface of the support.

When the silica is made part of the support by conventional impregnation techniques, the silica is deposited on the surface of the alumina core particulate. In this case, the silica provides a patch-like pattern of relatively thick, discontinuous coverage which results in lower ratios of silica to alumina surfaces with respect to the resultant product.

It has now been found that alumina core particulate can be clad with small amounts of silica to provide a support that exhibits a high tolerance to the presence of sulfurous materials per unit of silica present relative to silica coated alumina. The resultant support of the present invention provides a catalyst having an extended useful life for emission control. The formation of the present silica clad alumina particulate has been accomplished by the application of certain specific combination of process parameters, as fully described herein below.

The alumina particulate is first formed into aqueous slurry in which the solid concentration is within the range from 5 to 50 weight percent. The slurry should be sufficiently fluid to readily allow mixing of the slurry with the solution described below. The specific concentration used within this range will depend on the physical properties (e.g. surface area, void volume, etc. as well as particle size and shape) of the alumina forming the slurry. The concentration should be such that mixing of the slurry can be readily accomplished.

The slurry is heated to a temperature ranging from 50° to 100° C., preferably from 80° to 100° C. and most preferably from 90° to 95° C. Higher temperatures may be used but require the use of pressurized vessels. The increased equipment and handling costs to provided elevated temperatures above that indicated above are not necessary.

An aqueous solution of a water-soluble silica precursor compound is used. The silica precursor compound is preferably selected from an alkali metal silicate, such as, sodium silicate, potassium silicate and the like and mixtures thereof, with sodium silicate being preferred. The concentration of the silica precursor compound should be from 1 to 30, preferably 2 to 25 weight percent $SiO_2$ in the precursor solution. Although it is preferred to heat the solution to a temperature substantially the same as that of the alumina slurry prior to introduction into the heated alumina slurry, this preheating is not required.

The amount of aqueous solution of water soluble silica precursor compound will depend on the concentration of precursor in the solution and the desired weight percent of silica cladding to be part of the resultant clad alumina product. This amount can be readily calculated by the artisan.

The aqueous solution of silica precursor compound is mixed with the alumina slurry to form a uniform mixture of the materials. The temperature should be sufficient to maintain the silica precursor compound in solution. Such temperature is normally in the range of from 50° to 100° C., preferably from 80° to 100° C. and most preferably from 90°-95° C. The mixture is maintained at this elevated temperature for a period of time of from about 1 to 120 minutes, preferably from about 30 to 60 minutes and most preferably from about 45 to 60 minutes while maintaining sufficient agitation to maintain a uniform mixture.

The mixture is then treated with a water soluble acid to lower the pH of the mixture to a pH within the range of from 5 to 8, preferably 7 to 8. The acid may be selected from any inorganic mineral acid such as nitric, sulfuric or hydrochloric (preferred) acid or mixtures thereof. Alternately, one can use a water soluble $C_2$-$C_5$ (preferably $C_2$-$C_3$) organic acid as, for example acetic, propionic, butanoic, pentanoic acid and the like and mixtures thereof with acetic acid being preferred. Of the acids, those preferred are the inorganic acids, with hydrochloric acid and nitric acid being most preferred.

The aqueous solution of acid should be introduced into the prior formed mixture of silica precursor compound and alumina at a substantially constant rate to cause the pH of the mixture to be uniformly lowered to an initial pH within the range of from 7 to 8 (preferably a pH of 7.5) over an addition period of from 1 to 240 minutes, preferably from 1 to 30 minutes and more preferably from 1 to 20 minutes. The acid addition should be conducted at a substantially constant, slow rate with continuous mixing to cause uniform distribution of the acid throughout the mixture. High rates of addition should be avoided. This slow, constant addition with mixing should be conducted at least until the mixture attains the pH value of 8. Further addition of acid may be accomplished to provide for the desired end point pH (stated herein above) of the mixture. Still further, the acid in the addition solution can be of any concentration of acid (preferably from 0.5 to 3 molar) to permit the addition to be performed in a slow, uniform manner over the time period expressed above. The pH adjustment of the mixture can be performed at any temperature, such as from ambient to 100° C., with from 50 to 95° C. being preferred.

The aqueous suspension of the treated alumina particulates is then washed to remove the alkali metal material from the treatment suspension. The washing may be conducted using hot water or an aqueous solution of a water-soluble ammonium salt such as, for example, ammonium nitrate, ammonium sulfate, ammonium hydroxide, ammonium carbonate and the like or mixtures thereof. Ammonium nitrate, ammonium hydroxide or ammonium carbonate are preferred agents.

When the wash water is determined to be free of alkali metal, the aqueous suspension is filtered and the resultant solid is spray-dried to provide a powder product. This product is then calcined at elevated temperatures of from 400° to 1000° C. with from 600° to 800° C. being preferred.

The resultant product is a high surface area alumina particulate having silica cladding thereon. Unlike prior silica treated alumina products produced by conventional impregnation techniques, the present resultant product retains its high surface area and pore volume properties (thus, showing that the present clad product does not result in deposition which cause bridging of the pore walls to result in pore blockages). Further, infra-red spectrum analysis of the silica clad alumina particulate shows attenuation of adsorption peak associate with the Al—OH bond relative to the untreated alumina particulate. At the same time, silanol groups (Si—OH) appear. This is indicative that the silica forms a cladding on the surface of the alumina particulate material.

The aqueous silicate solution used to contact the alumina particulate should have sufficient concentration of silicate to cause the resultant silica clad alumina product to have from 1 to 8 weight percent silica ($SiO_2$), preferably from 2 to 5 weight percent silica based on the total weight of the resultant product. The resultant product formed according to the present invention has been unexpectedly found to have a high degree of tolerance to sulfur and sulfurous compounds (e.g. $SO_2$) normally associated with emission product stream of internal combustion engines in comparison to that achievable silica coated alumina particulate formed by conventional impregnation or co-precipitation techniques using the same amount of silica per unit of alumina.

The method described above has been found to unexpectedly achieve a silica clad support product having a high efficiency to resist sulfur adsorption, while retaining hydrothermal stability. The uniformity and breadth of coverage of silica can be shown by the effectiveness and efficiency of the support product to resist sulfur uptake. Sulfur uptake (SU) of a sample can be measured by the following "Sulfation Test". This test is performed by loading 50 mg of sample into a thermo gravimetric analyzer (TGA). The sample is first treated with 107.5 cc/min of He gas for 1 hour at 300° C. After this treatment, the flow of $SO_2$ in He (1.14% $SO_2$) is introduced at 5 cc/min and simultaneously $O_2$ is introduced at 12.5 cc/min. The total flow rate is 125 cc/min and the $SO_2$ concentration is 456 ppm. The sulfur uptake is measured as a function of time. In about 120 minutes, the sulfur uptake is equilibrated, at which point, no more uptake is possible. The Sulfur Uptake (SU) is defined as percentage of weight gained after 120 minutes of time-on-stream. The normalized sulfur uptake (NSU) is calculated by the following formula:

$$NSU = \frac{SU(\text{wt \%})}{100 \times SA}$$

where SU is the sulfur uptake in weight percent measured after 120 minutes of time-on-stream, and SA is the BET surface area of the sample.

The normalized sulfur uptake of a sample ($NSU_s$) and the normalized sulfur uptake of an unclad alumina forming the studied sample ($NSU_o$) when divided by the fraction of silica with respect to the alumina particulate (fs) provide the normalized enhancement or efficiency in sulfur tolerance ($\eta$) by the following formula:

$$\eta = \frac{(NSU_o) - (NSU_s)}{fs}$$

$$= \frac{\Delta(NSU)}{fs}$$

The normalized efficiency ($\eta$) of the presently achieved product is at least 1000 µg/m$^2$ per unit of silica reduction of sulfur uptake per mass fraction silica or, in reduced units (for the present teaching), 1000 µg/m$^2$. In most instances, the clad support product of the present invention exhibits an efficiency ($\eta$) of greater than 1200 and even greater than 1500 µg/m$^2$. In comparison, silica coated alumina products have low normalized efficiency of less than about 800 µg/m$^2$.

A direct comparison of the silica clad products of the present invention to that of an unclad alumina products or a silica-alumina product having the same weight percent silica formed by conventional impregnation or co-precipitation techniques shows that the present silica clad alumina particulate is superior in sulfur tolerance. In general, the presently formed silica clad alumina support has efficiency, as defined herein below, of at least 10 and in most cases about 20 percent higher than comparable silica coated alumina support products formed by co-precipitation or impregnation techniques.

The resulting silica clad alumina particulate, especially when in the form of a powder of from 1 to 200 µm, preferably from 10 to 100 µm, can be further used as a catalytic coating on a low surface area substrate. The substrate structure can be chosen from a variety of forms for a particular application. Such structural forms include monoliths, honeycomb, wire mesh and the like. The substrate structure is normally formed of a refractory material such as, for example, alumina, silica-alumina, silica-magnesia-alumina, zirconia, mullite, cordierite, as well as wire mesh and the like. Metallic honeycomb substrates can also be used. The powder is slurried in water, peptized by the addition of a small amount of acid (preferably mineral acids), and then subjected to milling to cause a reduction in particle size suitable for washcoating application. The substrate structure is contacted with the milled slurry, such as by dipping the substrate into the slurry. The excess material is removed, such as by application of blown air, followed by calcining the coated substrate structure to cause adhesion of the silica clad high surface area alumina particulates of the present invention to adhere to the substrate structure.

Noble metals, usually the metals of the platinum group, such as platinum, palladium, rhodium and mixtures thereof, can be applied to the present support in manners well known to those skilled in this art either before wash-coating the silica clad alumina particulate using a suitable conventional noble metal precursor (acidic or basic), or after wash-coating by dipping in a suitable noble-metal precursor solution (either acidic or basic).

Alternately, unclad high surface area alumina can be washcoated onto a chosen substrate followed by silica cladding in the manner described herein above. The resultant silica clad alumina contained on the substrate can then be subjected to noble metal application by dipping in a suitable noble metal precursor solution (either acidic or basic).

The preferred method is to first form the silica clad alumina followed by application of the noble metal thereto and, finally, to wash-coat the material onto a substrate.

Additional functionality can be provided by mixing the silica-cladded product with other oxide supports like alumina, magnesia, ceria, ceria-zirconia, rare-earth oxide-zirconia mixtures etc, and then washcoating these products onto a honeycomb substrate.

The resultant catalyst can be directly loaded into canisters and the like either alone or in combination with other materials as part of the exhaust emission system of an internal combustion engine. Thus, the exhaust products, which normally comprise oxygen, carbon monoxide, carbon dioxide, hydrocarbons, nitrogen oxides, sulfur, sulfurous compounds and sulfur oxides, are passed through the exhaust system to provide contact with the noble-metal supported catalyst. The result provides conversion of the noxious and harmful exhaust products into more environmentally acceptable materials. When using a catalyst formed with a support of the present invention, one achieves a catalyst system having extended active term and of higher overall activity than would be achieved with catalysts having supports either with no silica or with silica-alumina formed from conventional co-precipitation or impregnation techniques.

The following examples are given as specific illustration of the claimed invention. It should be understood, however, that the invention is not limited to the specific details set forth in the examples. All parts and percentages in the examples and in the remainder of the specification are by weight unless otherwise specified.

Further, any range of numbers recited in the specification or claims, such as representing a particular set of properties, units of measure, conditions, physical states or percentages, is intended to literally incorporate expressly herein by reference or otherwise, any number falling within such range, including any subset of numbers within any range so recited.

EXAMPLES

Alumina 1 Support

A commercial gamma-alumina (updoped) (Grace Davison Grade MI-307) was tested for sulfur uptake in the manner described in Example 1 below. The BET surface area of the sample was 172 m$^2$/g, the pore volume was 0.77 cc/g, the sulfur uptake (SU) was 1.1 wt % and NSU$_o$ was 64.0 µg/m$^2$-sample. The results are also given in Table 1 below.

Alumina 2 Support

A commercial lanthana (4 wt %) doped gamma-alumina (Grace Davison Grade MI-386) was tested for sulfur uptake using the standard Sulfur Uptake test described in Example 1 below. The BET surface area of the sample was 178 m$^2$/g, the pore volume was 0.77 cc/g, the sulfur uptake (SU) was 1.42 wt % and NSU$_o$ was 79.8 µg/m$^2$-sample. The results are also given in Table 1 below.

Example 1

A 1.3 weight percent silica clad alumina was prepared as follows. 52 g of commercial gamma-alumina (Grace Davison Grade MI-307) was formed into a slurry with 450 g of DI water. The slurry was heated to and maintained at 95° C. for 1 hour. Separately, a 50 vol. % solution of sodium silicate was prepared by mixing 150 cc of DI water with 150 cc of sodium silicate (26 wt. % SiO$_2$). About 3.55 g of a 50 vol. % sodium silicate solution was added to the alumina slurry over 5 minute time period. The temperature of the slurry was maintained at 95° C. with stirring for 30 minutes. A 1.2 M HNO$_3$ solution was then added slowly until the pH reached 7.5. The slurry was aged at 95° C. for an hour. The slurry was washed with 1 L of 1% solution of ammonium nitrate to remove residual Na. This was followed by washing with 1 L of hot DI water. The resultant filter cake was dried in an oven at 120° C. overnight and the dried powder was calcined at 700° C. for two hours.

The calcined powder had a BET surface area of 168 m²/g. The Sulfation Test was performed by loading 50 mg of sample into a thermo gravimetric analyzer (TGA). The sample was initially contacted with 107.5 cc/min of He gas for 1 hour at 300° C. After this treatment, a flow of $SO_2$ in He (1.14% $SO_2$) was introduced at 5 cc/min and simultaneously $O_2$ was introduced at 12.5 cc/min. The total flow rate was 125 cc/min and the $SO_2$ concentration was 456 ppm. Sulfur uptake measurements were taken over time. After 120 minutes, the sulfur uptake had equilibrated as indicated by lack of uptake. The sulfur uptake (SU) of the sample was 0.40% and the $NSU_s$ was 23.8 µg/m²-sample. The normalized efficiency η was 3092 µg/m². The results are also given in Table 1 below.

Example 2

A 2.3 weight percent silica clad alumina was prepared as follows. 51.5 g of commercial gamma-alumina (Grace Davison Grade MI-307) was formed into a slurry with 450 g of DI water. The slurry was heated to and maintained at 95° C. for 1 hour. Separately, a 50 vol. % solution of sodium silicate was prepared by mixing 150 cc of DI water with 150 cc of sodium silicate (26 wt. % $SiO_2$). About 7.2 of a 50 vol. % sodium silicate solution was added to the alumina slurry over 10 minute time period. The procedure for acidification, washing, drying and calcination was similar to that described in Example 1.

The calcined powder had a BET surface area of 168 m²/g. The product was tested for sulfur uptake using the standard Sulfur Uptake test described in Example 1 above. The sulfur uptake (SU) of the sample was 0.37% and the $NSU_s$ was 22.0 µg/m²-sample. The normalized efficiency η was 1825 µg/m². The results are also given in Table 1 below.

Example 3

A 3.5 weight percent silica clad alumina was prepared as follows. 51.0 g of commercial gamma-alumina (Grace Davison Grade MI-307) was formed into a slurry with 450 g of DI water. The slurry was heated to and maintained at 95° C. for 1 hour. Separately, a 50 vol. % solution of sodium silicate was prepared by mixing 150 cc of DI water with 150 cc of sodium silicate (26 wt. % $SiO_2$). About 10.7 of a 50 vol. % sodium silicate solution was added to the alumina slurry over 10 minute time period. The procedure for acidification, washing, drying and calcination was similar to that described in Example 1.

The calcined powder had a BET surface area of 166 m²/g. The product was tested for sulfur uptake using the standard Sulfur Uptake test described in Example 1 above. The sulfur uptake (SU) of the sample was 0.31% and the $NSU_s$ was 18.9 µg/m²-sample. The normalized efficiency η was 1307 µg/m². The results are also given in Table 1 below.

Example 4

A 1.7 weight percent silica clad alumina was prepared as follows. 34.3 lbs of commercial doped lanthana stabilized gamma-alumina (Grace Davison Grade MI-386SP) was formed into a slurry with 34 gal of DI water. The slurry was heated to and maintained at 95° C. for 1 hour. About 1.17 lbs of a 28.3% sodium silicate solution was added to the alumina slurry over 10 Minute time period. The procedure for acidification, washing, drying and calcination was similar to that described in Example 1.

The calcined powder had a BET surface area of 192 m²/g. The product was tested for sulfur uptake using the standard Sulfur Uptake test described in Example 1 above. The sulfur uptake (SU) of the sample was 0.94% and the $NSU_s$ was 49.0 µg/m²-sample. The normalized efficiency η was 1814 µg/m². The results are also given in Table 1 below.

Example 5

A nominal 2.1% silica clad on alumina (50 g batch) was prepared by slurring 22 lbs of alumina (Grace Davison Grade MI-386 (4% lanthana doped alumina)) in 190 lbs of DI water. The acid treatment, washing and drying was carried out as described in Example 4 except that 1.6 lbs of sodium silicate solution was used.

The calcined powder had a BET surface area of 179 m²/g. The product was tested for sulfur uptake using the standard Sulfur Uptake test described in Example 1 above. The sulfur uptake (SU) of the sample was 0.71% and the $NSU_s$ was 39.7 µg/m²-sample. The normalized efficiency η was 1911 µg/m². The results are also given in Table 1 below.

Example 6

A 6.0 silica clad on alumina (50 g batch) was prepared by slurring 50 parts alumina (Grace Davison Grade MI-386 (4% lanthana doped alumina)) in 572.3 parts of DI water. The acid treatment, washing and drying was carried out as described in Example 1 except that 17.86 parts of 50 vol % sodium silicate solution was used.

The BET surface area of the sample was 180 m²/g. The product was tested for sulfur uptake using the standard Sulfur Uptake test described in Example 1 above. The sulfur uptake (SU) was 0.34 wt % and $NSU_s$ was 18.9 µg/m²-sample. The normalized efficiency η was 1015 µg/m². The results are also given in Table 1 below.

The following examples are given for comparative purposes only and are not meant to be illustrative of the present invention.

Comparative Example 1

A commercial 5.5% silica in alumina (Grace Davison Grade MI-120) prepared by conventional co-precipitation was tested for sulfur uptake. The BET surface area of the sample was 265 m²/g. The product was tested for sulfur uptake using the standard Sulfur Uptake test described in Example 1 above. The sulfur uptake (SU) was 0.65 wt % and $NSU_s$ was 24.50 µg/m²-sample. The normalized efficiency η was 718 µg/m². The results are also given in Table 1 below.

Comparative Example 2

A 5.6 wt % silica in alumina was prepared by impregnation as follows. About 5 g of commercial alumina (Grace Davison Grade MI-307) was slurried in about 20 g of DI water and stirred for 1 hour. Separately, 0.625 g of colloidal silica (Ludox Grade AS-40 with 40% silica) was weighed. The 0.63 g colloidal silica was then added to the alumina slurry and stirred for 1 hour. The slurry was then evaporated to dryness on a hot plate. The resulting powder was dried in a drying oven at 100° C. overnight and calcined at 700° C. for 2 hours.

The BET surface area of the sample was 169 m²/g. The product was tested for sulfur uptake using the standard Sulfur Uptake test described in Example 1 above. The sulfur uptake (SU) was 0.70 wt % and $NSU_s$ was 41.4 µg/m²-sample. The normalized efficiency η was 402 µg/m².

Comparative Example 3

A 1.1 wt % silica in alumina was prepared by impregnation as follows. About 5.2 g of commercial alumina (Grace Davison Grade MI-386 (4% lanthana doped alumina)) was slurried in about 20 g of DI water and stirred for 1 hour. Separately, 0.125 g of colloidal silica (Ludox Grade AS-40 with 40% silica) was weighed. The 0.63 g colloidal silica was then added to the alumina slurry and stirred for 1 hour. The slurry was then evaporated to dryness on a hot plate. The resulting powder was dried in a drying oven at 100° C. overnight and calcined at 700° C. for 2 hours.

The BET surface area of the sample was 185 m$^2$/g. The product was tested for sulfur uptake using the standard Sulfur Uptake test described in Example 1 above. The sulfur uptake (SU) was 1.39 wt % and NSU$_s$ was 75.1 μg/m$^2$-sample. The normalized efficiency η was 409 μg/m$^2$.

Comparative Example 4

A 2.2 wt % silica in alumina was prepared by impregnation in manner similar to Example 3, except that the amount of colloidal silica added to the alumina slurry was 0.25 g.

The BET surface area of the sample was 185 m$^2$/g. The product was tested for sulfur uptake using the standard Sulfur Uptake test described in Example 1 above. The sulfur uptake (SU) was 1.32 wt % and NSU$_s$ was 71.4 μg/m$^2$-sample. The normalized efficiency η was 384 μg/m$^2$.

Comparative Example 5

A 5.4 wt % silica in alumina was prepared by impregnation in manner similar to Example 3, except that the amount of alumina used was 5.0 g and amount of colloidal silica added to the alumina slurry was 0.625 g.

The BET surface area of the sample was 184 m$^2$/g. The product was tested for sulfur uptake using the standard Sulfur Uptake test described in Example 1 above. The sulfur uptake (SU) was 1.2 wt % and NSU$_s$ was 65.2 μg/m$^2$-sample. The normalized efficiency η was 268 μg/m$^2$.

TABLE 1

| Example # | SiO$_2$ (%) | fs | SA (m$^2$/g) | SU (wt %) | NSU$_Q$ (μg/m$^2$) | NSU$_S$ (μg/m$^2$) | Normalized Efficiency η |
|---|---|---|---|---|---|---|---|
| Alumina 1 | 0.0 | 0.0 | 172 | 1.10 | 64.0 | — | — |
| Alumina 2 | 0.0 | 0.0 | 178 | 1.42 | 79.8 | — | — |
| 1 | 1.3 | 0.013 | 168 | 0.40 | 64 | 23.8 | 3092 |
| 2 | 2.3 | 0.023 | 168 | 0.37 | 64 | 22.0 | 1825 |
| 3 | 3.5 | 0.035 | 166 | 0.31 | 64 | 18.9 | 1307 |
| 4 | 1.7 | 0.017 | 192 | 0.94 | 79.8 | 49.0 | 1814 |
| 5 | 2.1 | 0.021 | 179 | 0.71 | 79.8 | 39.7 | 1911 |
| 6 | 6.0 | 0.06 | 180 | 0.34 | 79.8 | 18.9 | 1015 |
| Comp. 1 | 5.5 | 0.055 | 265 | 0.65 | 64 | 24.5 | 718 |
| Comp. 2 | 5.6 | 0.056 | 169 | 0.70 | 64 | 41.4 | 402 |
| Comp. 3 | 1.1 | 0.011 | 185 | 1.39 | 79.8 | 75.1 | 409 |
| Comp. 4 | 2.2 | 0.022 | 185 | 1.32 | 79.8 | 71.4 | 384 |
| Comp. 5 | 5.4 | 0.054 | 184 | 1.2 | 79.8 | 65.2 | 268 |

We claim:

1. A structure comprising alumina core particulate having a pore volume of at least about 0.2 cc/g, a surface area of greater than about 20 m$^2$/g and having silica cladding on the surface area of said alumina core particulate, wherein the structure has from about 1 to about 8 weight percent silica and has a sulfur tolerance efficiency (η) of at least 1000μg/m$^2$.

2. The structure of claim 1 wherein the alumina core is composed of particulates having an average particle size of from 1 to 200 μm and having a BET surface area of from about 20 to 400 m$^2$/g.

3. The structure of claim 2 wherein the alumina core particulates have a BET surface area of from 100 to 300 m$^2$/g and a nitrogen pore volume of from 0.2 to 2 cc/g.

4. The structure of claim 1 wherein the alumina core is composed of particulates having an average particle size of from 1 mm to 10 mm and a BET surface area of from about 20 to 400 m$^2$/g.

5. The structure of claim 1, 2, 3 or 4 wherein the silica cladding comprises from 2 to 5 weight percent of the structure.

6. The structure of claim 1 wherein the alumina core comprises an alumina selected from bayerite, böhmite, gibbsite, gamma-alumina, delta-alumina, theta-alumina or mixtures thereof.

7. The structure of claim 5 wherein the alumina core comprises gamma-alumina, delta-alumina or mixtures thereof.

8. The structure of claim 1 wherein the alumina core further comprises up to about 10 weight percent of a dopant with respect to said alumina.

9. The structure of claim 6 wherein the alumina core further comprises up to about 10 weight percent of a dopant with respect to said alumina.

10. The structure of claim 7 wherein the alumina core further comprises up to about 10 weight percent of a dopant with respect to said alumina.

11. The structure of claim 1 wherein the structure has a sulfur tolerance efficiency (η) of at least 1200 μg/m$^2$ per unit of silica.

12. The structure of claim 6 wherein the structure has a sulfur tolerance efficiency (η) of at least 1200 μg/m$^2$ per unit of silica.

13. The structure of claim 7 wherein the structure has a sulfur tolerance efficiency (η) of at least 1200 μg/m$^2$ per unit of silica.

14. The structure of claim 1 wherein the structure has a sulfur tolerance efficiency (η) of at least 1500 μg/m$^2$ per unit of silica.

15. The structure of claim 6 wherein the structure has a sulfur tolerance efficiency (η) of at least 1500 μg/m$^2$ per unit of silica.

16. The structure of claim 7 wherein the structure has a sulfur tolerance efficiency (η) of at least 1500 μg/m$^2$ per unit of silica.

17. A catalyst composition comprising the structure of claim 1, 2, 3 or 4 having a catalytic amount of a noble metal distributed thereon.

18. A catalyst composition comprising the structure of claim 6 having a catalytic amount of a noble metal distributed thereon.

19. A catalyst composition comprising the structure of claim 7 having a catalytic amount of a noble metal distributed thereon.

20. A catalyst composition comprising the structure of claim 8 having a catalytic amount of a noble metal distributed thereon.

21. A catalyst composition comprising the structure of claim 10 having a catalytic amount of a noble metal distributed thereon.

22. A catalyst composition comprising the structure of claim 11 having a catalytic amount of a noble metal distributed thereon.

23. The catalyst composition of claim 19 wherein the noble metal comprises platinum, palladium or mixtures thereof.

24. The catalyst composition of claim 20 wherein the noble metal comprises platinum, palladium or mixtures thereof.

25. The catalyst composition of claim 17 wherein the noble metal comprises platinum, palladium or mixtures thereof.

26. The catalyst composition of claim 18 wherein the noble metal comprises platinum, palladium or mixtures thereof.

27. A structure comprising alumina core particulate having a pore volume of at least about 0.2 cc/g, a surface area of greater than 20 m$^2$/g and having silica cladding on the surface area of said alumina core particulate, wherein the structure has from about 1 to about 8 weight percent silica and has a sulfur tolerance efficiency ($\eta$) of at least 1000 µg/m$^2$ and said structure is formed by a process comprising forming an aqueous slurry having from 5 to 50 weight percent of alumina particulate; contacting at elevated temperature said slurry with an aqueous solution having from 1 to 30 weight percent of a water-soluble silicate to form a mixture thereof; adding a water soluble acid at a slow constant rate to said mixture over a period of from 1 to 240 minutes to cause the resultant mixture to have a pH of from 5 to 8; and separating and recovering a dried powder product.

28. The structure of claim 27 wherein the alumina core is composed of particulates having an average particle size of from 1 to 200 µm and having a BET surface area of from about 20 to 400 m$^2$/g.

29. The structure of claim 27 wherein the alumina core comprises an alumina selected from bayerite, böhmite, gibbsite, gamma-alumina, delta-alumina, theta-alumina or mixtures thereof.

30. The structure of claim 27, 28 or 29 wherein the process includes forming the slurry of alumina particulate and aqueous solution of a water soluble silicate at an elevated temperature of from 50° to 100° C. and maintaining said slurry at said temperature for a period of from 1 to 120 minutes; the water soluble acid comprises at least one inorganic mineral acid; and the separating and recovering of the resultant silica clad alumina comprises initially washing said clad alumina to remove alkali metal material therefrom.

* * * * *